(12) United States Patent
Srivastava et al.

(10) Patent No.: US 11,258,540 B2
(45) Date of Patent: Feb. 22, 2022

(54) ULTRA-RELIABILITY FOR CELLULAR VEHICLE-TO-EVERYTHING (C-V2X) PC5 COMMUNICATIONS

(71) Applicant: Cisco Technology, Inc., San Jose, CA (US)

(72) Inventors: Vimal Srivastava, Bangalore (IN); Srinath Gundavelli, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 143 days.

(21) Appl. No.: 16/516,776

(22) Filed: Jul. 19, 2019

(65) Prior Publication Data

US 2021/0021376 A1 Jan. 21, 2021

(51) Int. Cl.
*H04L 1/00* (2006.01)
*H04W 76/11* (2018.01)
(Continued)

(52) U.S. Cl.
CPC .......... *H04L 1/0088* (2013.01); *H04L 1/0091* (2013.01); *H04W 4/40* (2018.02);
(Continued)

(58) Field of Classification Search
CPC ....... H04B 7/0413; H04L 1/00; H04L 1/0018; H04L 1/0025; H04L 1/0026; H04L 1/18;
(Continued)

(56) References Cited

U.S. PATENT DOCUMENTS 10,334,594 B2 * 6/2019 Sundararajan .... H04W 72/0446
2007/0291708 A1 12/2007 Rao
(Continued)

FOREIGN PATENT DOCUMENTS

| EP | 3244677 A1 | 11/2017 |
|---|---|---|
| WO | 2018131975 A1 | 7/2018 |
| WO | 2018172136 A1 | 9/2018 |

OTHER PUBLICATIONS

International Search Report and Written Opinion in counterpart International Application No. PCT/US2020/041768, dated Oct. 29, 2020, 16 pages.

(Continued)

*Primary Examiner* — Marsha D Banks Harold
*Assistant Examiner* — Dharmesh J Patel
(74) *Attorney, Agent, or Firm* — Edell, Shapiro & Finnan, LLC

(57) ABSTRACT

Techniques are described to provide ultra-reliability for cellular vehicle-to-everything (C-V2X) PC5 communications, including Network Assisted mode and Autonomous mode communications. In one example, a method includes receiving, by a radio unit of a system, a communication from a user equipment, such as a V2X-UE, wherein the communication comprises a data packet, a Layer 2 destination identifier, and an indication that the data packet is associated with a transmission type; determining whether transmission for the data packet is allowed for the transmission type; based on determining that transmission for the data packet is allowed for the transmission type, communicating a response to the UE, wherein the response provides a confirmation to the UE that the data packet was received by the radio unit and that the transmission type can be performed by the radio unit; and transmitting, by the radio unit, the data packet to one or more other UEs.

20 Claims, 7 Drawing Sheets

(51) Int. Cl.
 H04W 4/40 (2018.01)
 H04W 28/04 (2009.01)
 H04W 72/14 (2009.01)

(52) U.S. Cl.
 CPC ........... *H04W 28/04* (2013.01); *H04W 72/14* (2013.01); *H04W 76/11* (2018.02)

(58) Field of Classification Search
 CPC ....... H04L 1/20; H04L 1/1812; H04L 1/1825; H04W 4/40; H04W 4/44; H04W 28/02; H04W 72/042; H04W 72/0446; Y02D 70/00; Y02D 70/1224; Y02D 70/1242; Y02D 70/1262; Y02D 70/142; Y02D 70/144; Y02D 70/146; Y02D 70/164; Y02D 70/166; Y02D 70/21; Y02D 70/22; Y02D 70/23; Y02D 70/24
 See application file for complete search history.

(56) References Cited

U.S. PATENT DOCUMENTS

| 2016/0295624 | A1 | 10/2016 | Novlan et al. | |
| 2018/0288746 | A1* | 10/2018 | Zhang | H04L 1/0031 |
| 2019/0052432 | A1* | 2/2019 | Islam | H04L 5/0005 |
| 2019/0182807 | A1* | 6/2019 | Panteleev | H04L 1/0068 |

OTHER PUBLICATIONS

Huawei et al., "Support of QoS for PC5-based V2V transport", 3GPP TSG-RAN WG2 Meeting #93bis, R2-162286, https://www.3gpp.org/ftp/tsg_ran/WG2_RL2/TSGR2_93bis/Docs/, Apr. 11-15, 2016. 6 pages.

Husain, Syed S. et al., "Ultra-High Reliable 5G V2X Communications", IEEE Communications Standards Magazine, Jun. 2019, 4 pages.

Ji Lianghai et al., "Applying Multiradio Access Technologies for Reliability Enhancement in Vehicle-to-Everything Communication", Digital Object Identifier 10.1109/ACCESS.2018.2829606, Apr. 23, 2018, 16 pages.

Nadia Brahmi et al., "Deliverable D4.1 Initial design of 5G V2X system level architecture and security framework", Version: v1.0, Fifth Generation Communication Automotive Research and innovation, Apr. 30, 2018, 151 pages.

IEEE, "P802.1CB/D2.6, Aug. 2016—IEEE Draft Standard for Local and metropolitan area networks—Frame Replication and Elimination for Reliability", Jan. 1, 2016, Electronic ISBN: 978-1-5044-2411-0, https://ieeexplore.ieee.org/document/7586238, 2 pages.

Electronics Notes, "LTE Channels: Physical, Logical and Transport", https://www.electronics-notes.com/articles/connectivity/4g-lte-long-term-evolution/physical-logical-transport-data-channels.php, downloaded Jul. 16, 2019, 10 pages.

3GPP Organizational Partners, "3rd Generation Partnership Project; Technical Specification Group Services and System Aspects; Architecture enhancements for V2X services (Release 16)", 3GPP TS 23.285 V16.0.0, Mar. 2019, 37 pages.

ETSI, "LTE; Evolved Universal Terrestrial Radio Access (E-UTRA); Radio Resource Control (RRC); Protocol specification (3GPP TS 36.331 version 10.1.0 Release 10)", ETSI TS 136 331 V10.1.0, Apr. 2011, 292 pages.

3GPP Organizational Partners, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.2.0, Mar. 2019, 418 pages.

3GPP Organizational Partners, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.1, Apr. 2019, 948 pages.

3GPP Organizational Partners, "3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725 V16.1.0, Mar. 2019, 91 pages.

* cited by examiner

ULTRA-RELIABILITY FOR CELLULAR VEHICLE-TO-EVERYTHING (C-V2X) PC5 COMMUNICATIONS

TECHNICAL FIELD

The present disclosure relates to telecommunications technology.

BACKGROUND

Cellular vehicle-to-everything (C-V2X) allows methods for communications utilizing the 'Uu' interface, also referred to as the Uu reference point, and PC5 communications using the PC5 interface, also referred to as the PC5 reference point. For Long Term Evolution Uu (LTE-Uu) based communications, a vehicle-to-everything (V2X) enabled user equipment (V2X-UE) establishes a packet data network (PDN) connection with a core network and sends packets to the core network. The core network then broadcasts or unicast the packets to intended V2X-UEs. For PC5 based communications, a V2X-UE can broadcast packets directly to other V2X-UEs via the PC5 interface. However, there are challenges in facilitating ultra-reliability for certain PC5 communications.

DESCRIPTION OF EXAMPLE EMBODIMENTS

Overview

Figure 1:
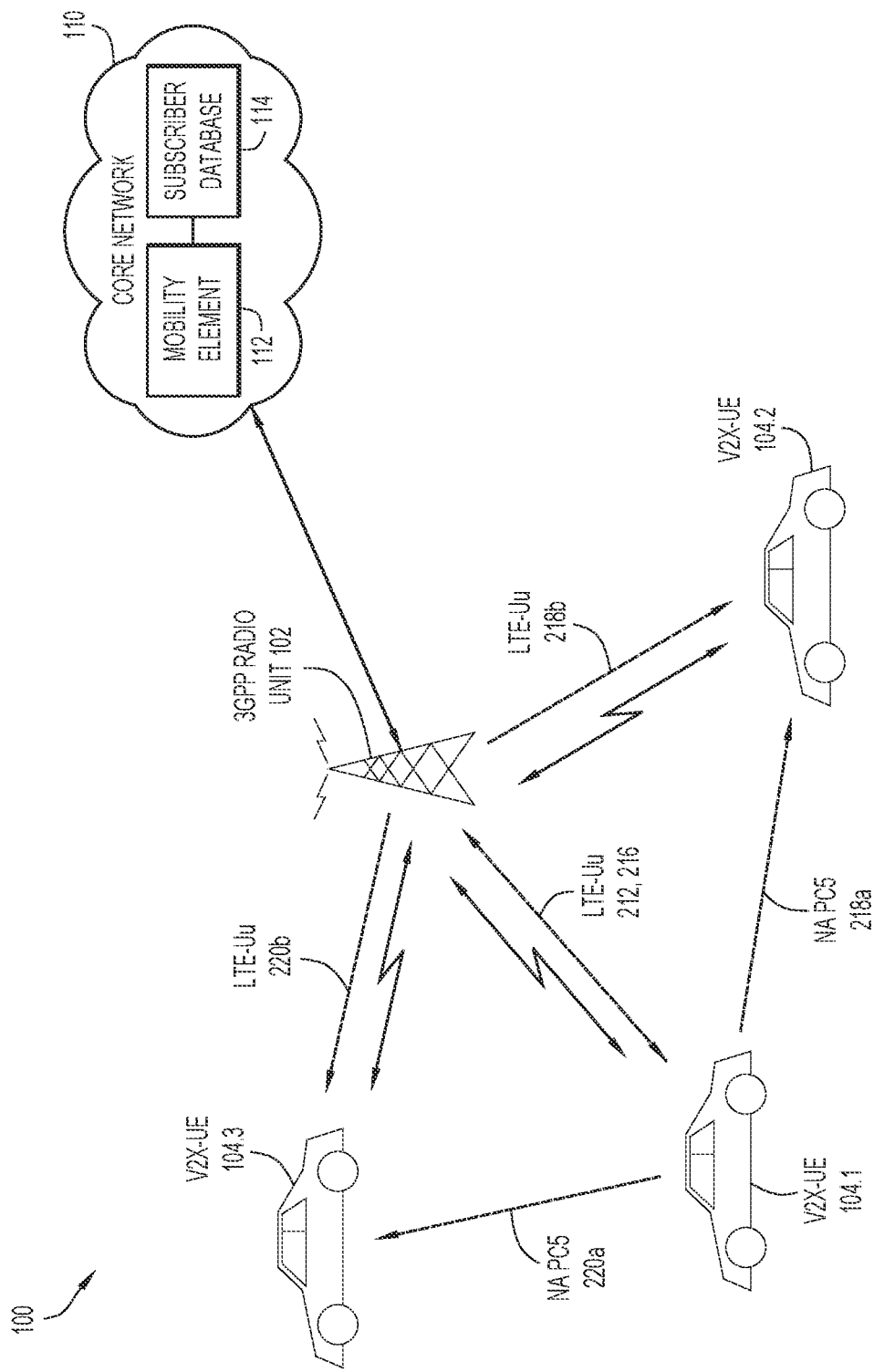
FIG. 1 is a block diagram of a system in which techniques for providing ultra-reliability for cellular vehicle-to-everything (C-V2X) PC5 communications may be implemented, according to an example embodiment.

Ultra-Reliable Low-latency Communication (URLLC) has been a study item in Third Generation Partnership Project (3GPP) standards and multiple solutions are provided in 3GPP for LTE-Uu based Protocol Data Unit (PDU) connections. However, PC5 based communication is a preferable mode of vehicular communication due to much lower latency involved in such communications. Presented herein are techniques to provide ultra-reliability for both Network Assisted and Autonomous PC5 communications. In an example embodiment, a method is provided that includes receiving, by a radio unit of a system, a communication from a user equipment (UE), wherein the communication comprises a data packet, a Layer 2 destination identifier, and an indication that the data packet is associated with a transmission type; determining, by the radio unit, whether transmission for the data packet is allowed for the transmission type; based on determining that transmission for the data packet is allowed for the transmission type, communicating a response to the UE, wherein the response provides a confirmation to the UE that the data packet was received by the radio unit and that the transmission type can be performed by the radio unit; and transmitting, by the radio unit, the data packet to one or more other UEs.

Example Embodiments

The following foundational information may be viewed as a basis from which the present disclosure may be properly explained. Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. As referred to herein, the terms 'packet' and 'data packet' can be used interchangeably.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

In cellular vehicle-to-everything (C-V2X), there are two modes specified in Third Generation Partnership Project (3GPP) standards for PC5 based communications including: A) Network Assisted (NA) mode when a UE (e.g., a V2X-UE) is served by an Evolved Universal Mobile Telecommunications System (UMTS) Terrestrial Radio Access (E-UTRA) air interface or is served by a New Radio (NR) air interface; and B) Autonomous mode when a UE is not served by the E-UTRA or NR air interface. In general, a V2X-UE may be any UE for which one or more V2X applications are configured and/or provisioned thereon. PC5 communications are sometimes referred to as side link (SL) communications.

One basis of C-V2X communications is that the 3GPP system should be able to control the uplink (UL) and downlink (DL) reliability of transport of V2X communications, depending on a given V2X application. There are many use cases such as police, fire, ambulance, etc. that involve ultra-reliable communication for PC5 based C-V2X communication. Ultra-Reliable Low-Latency Communication (URLLC) is one of the study item in 3GPP standards (e.g., 3GPP Technical Report (TR) 23.725). In order to ensure high-reliability, redundant transmissions in 5G systems may be supported. Depending on the condition of network deployment, where network functions or segments cannot meet certain levels of reliability, redundant transmissions may be applied on the user plane path between the UE and the network. There are multiple solutions studied and concluded for providing high reliability message delivery for use cases related normal PDU connections. In general, these solutions rely on two mechanisms: 1) redundant user plane paths based on dual connectivity; and 2) supporting redundant data transmission via a single User Plane Function (UPF) and a single radio access network (RAN) node.

The solution involving redundant user plane paths based on dual connectivity enables a terminal device (e.g., a UE) to set up two redundant PDU Sessions over a 5G network, so that the network will attempt to make the paths of the two redundant PDU sessions independent whenever that is possible. For example, a UE may set up two PDU Sessions, one via a Master gNodeB (MgNB) to a first UPF (UPF1) acting as the PDU Session anchor, and another one via a Secondary gNodeB (SgNB) to a second UPF (UPF2) acting as the PDU session anchor. UPF1 and UPF2 connect to the same Data Network (DN) even though the traffic via UPF1 and UPF2 might be routed via different user plane nodes within the DN. UPF1 and UPF2 are controlled by a first Session Management Function (SMF1) and a second SMF (SMF2), respectively, where SMF1 and SMF2 may coincide depending on operator configuration of the SMF selection.

For the solution involving supporting redundant data transmission via a single UPF and a single RAN node, it is assumed that the reliability of a Next Generation RAN (NG-RAN) node, UPF, and Control Plane (CP) Network Functions (NFs) are high enough to fulfill the reliability needed for URLLC services served by these NFs. However, the reliability of a single N3 tunnel is considered not high enough (e.g. due to the deployment environment of backhaul network), so the redundant packets will be transferred between the UPF and the RAN via two independent N3 tunnels, which are associated with a single PDU Session, over different transport layer paths to enhance the reliability of service.

To ensure the two N3 tunnels can be transferred via disjointed transport layer paths, the NG-RAN node, SMF, or UPF will provide different routing information in the tunnel information (e.g., different Internet Protocol (IP) addresses or different Network Instances), and the routing information will be mapped to disjoint transport layer paths according to network deployment configuration. This solution supports the redundant transmission based on two N3 tunnels between a single NG-RAN node and the UPF. The RAN node and UPF also support packet replication and elimination functions.

As noted previously, C-V2X proposes two primary methods of communication, LTE-Uu based and PC5 based. In case of LTE-Uu based communication, a V2X-UE establishes a PDU connection with the core network and then UL/DL packet transmission can take place. The above URLLC solutions apply to this mode of V2X communication. In case of PC5 communication, V2X-UEs directly talks to each other without involvement of a core network. However, since there is no involvement of the core network, the above URLLC solutions do not provide reliability in case of PC5 based communication.

With advance use cases in C-V2X such as automated driving, remote sensing, platooning, and many of the basic safety use cases it becomes very important that ultra-reliability is supported on PC5 based communication. The problem is that the URLLC solution proposed in 3GPP works for the LTE-Uu based V2X communication but does not address ultra-reliability in case of PC5 based communication in the C-V2X scenario.

Presented herein are techniques that provide for ultra-reliability for both Network Assisted and Autonomous PC5 communications for C-V2X scenarios. In Autonomous Mode, a V2X-UE uses radio resources configured within the device itself and/or in the Universal Integrated Circuit Card (UICC) for communication, whereas in case of Network Assisted Mode, V2X-UE requests a RAN node (e.g., eNodeB, etc.) for radio resources to be used for a data packet exchange, and the RAN node, after doing some validations such as PC5 Access Point Name (APN) Aggregate Maximum Bit Rate (AMBR) (PC5-APN-AMBR) validations, provides the radio resources (e.g., radio resource blocks) to the V2X-UE. The V2X-UE uses these radio resource blocks (RBs) to send the packets to other V2X-UEs on the PC5 interface.

Techniques presented herein provide that a V2X-UE, while sending packet(s) to other radio units such as other V2X-UE on the PC5 (side link), also sends packet(s) to a radio unit of a 3GPP RAN for Network Assisted PC5 communications or, for Autonomous PC5 communications, to a Road Side Unit (RSU) (if in proximity and configured to support URLLC communications). For Network Assisted PC5 communications, the radio unit of the 3GPP RAN can be a replicator to provide redundant transmission(s) of the packet. For Autonomous PC5 mode, a radio unit such as the RSU or another V2X-UE can be the replicator to broadcast the packet again in a redundant transmission.

Thus, ultra-reliability can be provided for both Network Assisted and Autonomous PC5 communications to ensure that intended recipients will receive data packet(s) from a source V2X-UE for which replication is sought as well as from another radio unit (e.g., a 3GPP RAN node, a RSU, or another V2X-UE). A Redundancy Handler Function (RHF) present in V2X-UEs will handle the duplicate packets in order to remove/discard duplicates. In various embodiments, one or more validations can be performed on a received data packet, the V2X-UE sending the data packet, and/or the V2X application associated with the data packet before a given radio unit determines to be a replicator and/or transmit a duplicate packet.

FIG. 1 is a block diagram of a system 100 in which techniques for providing ultra-reliability for C-V2X PC5 communications may be implemented, according to an example embodiment. In particular, system 100 may be associated with providing ultra-reliability for Network Assisted (NA) PC5 communications. In at least one implementation, the system 100 may include a 3GPP radio unit 102 and a core network 110. Core network 110 may include a mobility element 112 and a subscriber database 114. Also illustrated in system 100 are a number of V2X UEs 104.1-104.3. It is to be understood that any number of V2X UEs may be present in system 100.

In general, interfaces among one or more network elements, functions, services, etc. of system 100 may include wired and/or wireless interfaces. For system 100, 3GPP radio unit 102 may interface with any of mobility element 112 and subscriber database 114 of core network 110 to perform various operations as described herein. Additionally, mobility element 112 and subscriber database of core network 110 may interface with each other to perform various operations as described herein.

3GPP radio unit 102 may include one or more antenna assemblies as well as transmitter and receiver hardware (sometimes referred to as a 'radio head') and/or software to facilitate RF communications with V2X UEs 104.1-104.3, which may each also include such antenna assemblies and transmitter/receiver hardware and/or software to perform operations as described herein. In general, 3GPP radio unit 102 may facilitate 3GPP cellular communications for one or more radio access technology (RAT) types, including any combination of Third (3rd) Generation (3G), Fourth (4th) Generation/LTE/LTE-Advanced (4G/LTE/LTE-A), Fifth (5th) Generation (5G), and/or New Radio (NR) communications within system 100.

In various embodiments, 3GPP radio unit 102 may be any combination of a NodeB (e.g., for 3G architectures), an evolved Node B (eNodeB) (e.g., for 4G/LTE architectures), a gNodeB (e.g., for 5G architectures) and/or a NR radio unit (e.g., for any next generation 3GPP architectures). In some implementations, 3GPP radio unit 102 may form a whole or part of one or more Radio Access Networks (RANs) (e.g., an Evolved Universal Mobile Telecommunications System (UMTS) Terrestrial RAN (E-UTRAN) for 4G/LTE RANs, 5G RANs, etc.). In some embodiments, 3GPP radio unit 102 may be any combination of a distributed unit (DU) and/or centralized unit (CU) for a disaggregated RAN architecture. It is to be understood that any number of 3GPP radio units 102 may be present within system 100 in accordance with various embodiments.

In general, core network 110 may be associated with any combination of 3GPP core networks such as, for example, an Evolved Packet Core (EPC) (e.g., for 4G/LTE architectures), a 5G Core network (5GC), and/or any next generation 3GPP core network(s). Mobility element 112 and subscriber database are illustrated within core network 110 for purposes of illustrating various features to facilitate ultra-reliability for PC5 communications for one or more V2X-UEs; however, it is to be understood that core network 110 may include any other elements, functions, services, repositories, etc. and may facilitate operations, communications, etc. that may or may not conform to one or more standards such as 3GPP standards, European Telecommunications Standards Institute (ETSI) standards, Internet Engineering Task Force (IETF), Institute of Electrical and Electronics Engineers (IEEE) standards, and/or the like.

Among other operations as described herein for providing ultra-reliability for Network Assisted PC5 communications, mobility element 112 may, in general, provide access authentication services, authorization services, and mobility management control for one or more UEs (e.g., V2X-UEs 104.1-104.3). In various embodiments, mobility element 112 may be implemented as any combination of a mobility management element (MME) (e.g., for 4G LTE architectures, including 4G control and user plane separation (4G CUPS) architectures) and/or an access and mobility management function (AMF) (e.g., for 5G and/or New Radio (NR) architectures, including non-standalone (NSA) and standalone (SA) architectures).

Subscriber database 114 may be any server, service, repository, combinations thereof, and/or the like which may store and/or provide subscription and/or policy information for one or more subscribers (e.g. V2X-UEs 104.1-104.3) within system 100 to facilitate operations associated with providing ultra-reliability. In various embodiments, subscriber database 114 may be any combination of a Home Subscriber Server (HSS), a Unified Data Management (UDM) entity, a Policy and Charging Rules Function (PCRF), a Policy Control Function (PCF), and/or the like.

In various embodiments, V2X-UEs described herein (e.g., V2X-UEs 104.1-104.3 and V2X-UE 104.4 (FIGS. 3-4)) may be associated with any user, subscriber, employee, client, customer, electronic device, etc. having one or more V2X application provisioned therefor that may seek to initiate a flow in system 100. The terms 'C-V2X UE', 'V2X-UE', 'UE device', 'UE', 'subscriber', 'UE/subscriber', 'mobile device', 'user', and variations thereof are inclusive of V2X-UEs having one or more V2X applications configured and/or provisioned thereon, which are used to initiate a communication, such as a computer, a vehicle, train, boat, airplane, drone, and/or any other transportation related device having electronic devices configured thereon, an electronic device such as a parking meter, vending machine, industrial device, automation device, enterprise device, appliance, Internet of Things (IoT) device, etc., a personal digital assistant (PDA), a laptop or electronic notebook, a cellular telephone, an iPhone™, iPad™, a Google Droid™ phone, an IP phone, wearable electronic device or any other device, component, element, or object capable of initiating voice, audio, video, media, or data exchanges within system 100. V2X-UEs discussed herein may also be inclusive of a suitable interface to a human user such as a microphone, a display, a keyboard, or other terminal equipment. V2X-UEs discussed herein may also be any device that seeks to initiate a communication on behalf of another entity or element such as a program, a database, or any other component, device, element, or object capable of initiating an exchange within system 100. It is to be understood that any number of V2X-UEs may be present in system 100.

Respective V2X-UEs 104.1-104.3 may interface with 3GPP radio unit 102 via respective over-the-air radio frequency (RF) communications utilizing respective 3GPP LTE-Uu interfaces utilizing the carrier frequency. In some instances, respective V2X-UEs 104.1-104.3 may perform over-the-air RF communications with each other utilizing respective 3GPP PC5 interfaces, which can utilize the carrier frequency for Network Assisted mode PC5 communications, but which does not need to be the carrier frequency for Autonomous mode PC5 communications but rather utilizing preconfigured radio resources (e.g., a preconfigured channel).

Figure 2:
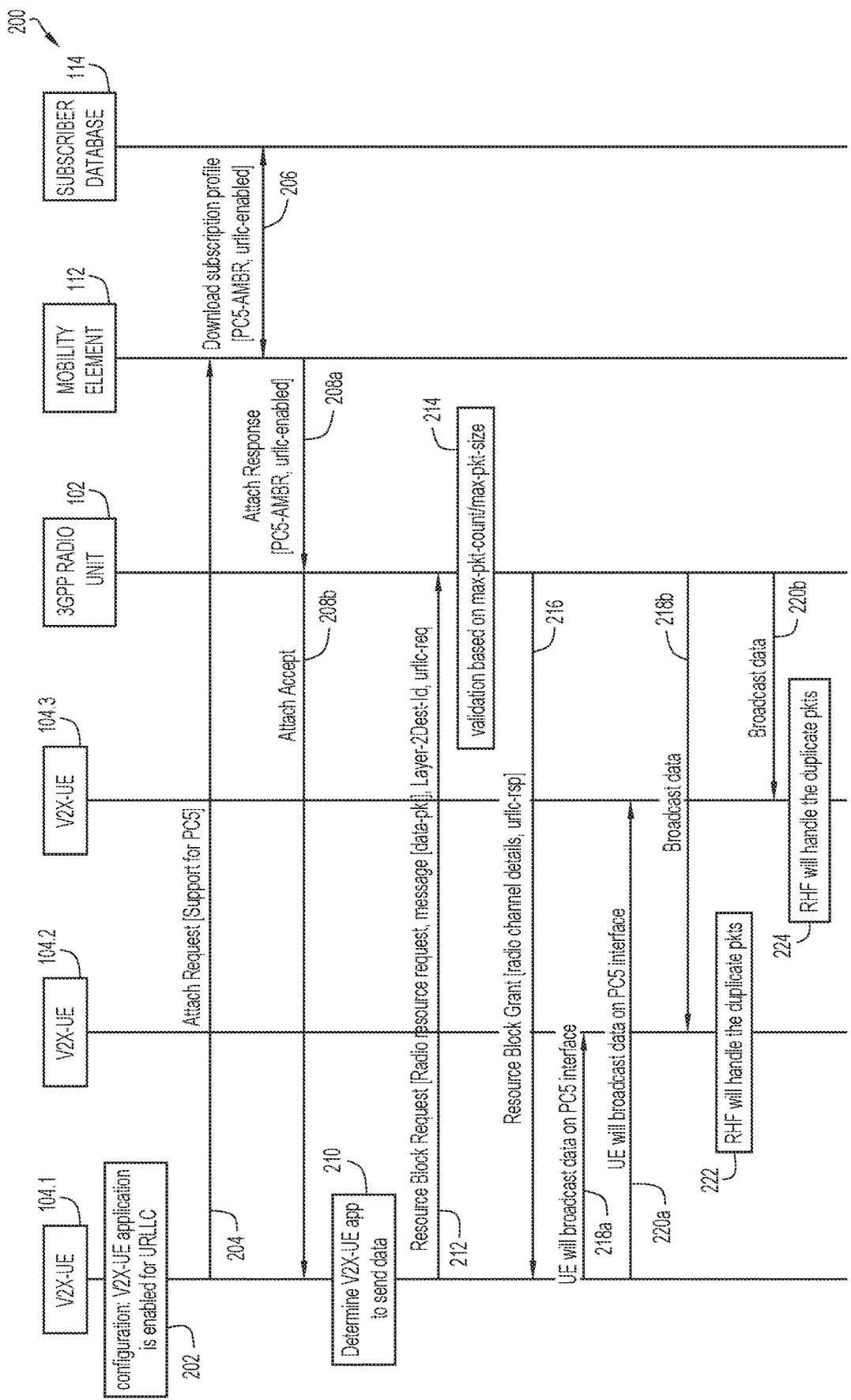
FIG. 2 is a message sequence diagram illustrating a call flow for providing ultra-reliability for Network Assisted PC5 communications for the system of FIG. 1, according to an example embodiment.

Consider an operational example in which ultra-reliability is provided for Network Assisted PC5 communications from V2X-UE 104.1 to each of V2X-UE 104.2 and V2X-UE 104.3. The present operational example is discussed with reference to FIG. 2, which is a message sequence diagram illustrating a call flow 200 for providing ultra-reliability for Network Assisted PC5 communications within system 100, according to an example embodiment.

For the present example, it is assumed at 202, that a V2X application provided for V2X-UE 104 is URLLC enabled (e.g., enabled for supporting URLLC operations/transmissions). In various embodiments, one or more V2X application(s) and subscription information, privileges, policies, etc. associated with each V2X application (e.g., that a given V2X application is enabled for URLLC) that may be provisioned for a V2X-UE can be configured for the V2X-UE in the device itself and/or in the UICC for the device. In various embodiments, V2X applications may include any type of applications such as traffic-related applications, weather-related applications, maintenance applications, safety applications, etc.

It is further assumed for the present example that subscription information associated with V2X-UE 104.1, which may be stored in subscriber database 114, is configured or otherwise provisioned to indicate that V2X-UE 104.1 is subscribed to receive ultra-reliability for one or more V2X applications. In various embodiments, subscription information associated with ultra-reliability that may be provided for one or more V2X applications for a V2X-UE may include, but not be limited to, per-V2X application and/or per-service information for a given V2X application (e.g., a V2X application may perform different services, functions, etc.) such as an indication that URLLC is to be used for one or more packet(s) to replicate the packet(s) (provide duplicate transmissions of the packet(s)), a maximum number of packets that can be replicated, a maximum packet size for which duplicate transmissions may be provided, V2X application/service identifying information, among others. In at least one embodiment, V2X application identifying information may include a lower layer semantic, such as Layer 2 destination identifier (e.g., an Ethernet-based multicast group address) that can be used to identify packet(s) associated with a given V2X application. In at least one embodiment, V2X application identifying information may include one or more of higher layer semantics, such as an application identifier ('app-id'), which can be any alphanumeric value, bit string, etc. used to identify a V2X application and/or service identifying information ('svc-id'), which can be any alphanumeric value, bit string, etc. that can be used to identify a particular service for a given V2X application. Other semantics, such as L3 multicast and/or unicast addresses, such as IP version 4 (IPv4) and/or IP version 6 (IPv6) addresses, among other types of multicast/unicast addresses may be envisioned.

Returning to the present example, at 204, V2X-UE 104.1 sends an attach request message to mobility element 112 that includes an indication of support for PC5. Based on the attach request, mobility element 112 initiates an exchange (e.g., request/response) with subscriber database 114 to download, at 206, the subscription profile (information) for V2X-UE 104.1, which includes PC5-AMBR information, an indication that URLLC is enabled (e.g., a parameter 'urllc-enabled' may be included) for V2X-UE 104.1, a maximum packet count (e.g., a parameter 'max-pkt-count' may be included) and maximum packet size (e.g., a parameter 'max-pkt-size' may be included) for which redundant transmissions may be provided for a given V2X application for V2X-UE 104.1, and an indication that replication can be provided for performing redundant transmissions (e.g., a parameter 'can-replicate' may be included) for a given V2X application, among other information. The term 'replication' and variations thereof referred to herein can refer to operations which involve duplicating (e.g., copying) a packet and broadcasting the packet.

At 208a, mobility element 112 communicates an attach response message to 3GPP radio unit 102, which includes the subscription information for V2X-UE 104.1 (e.g., PC5-AMBR and the 'urllc-enabled' indication). At 208b, 3GPP radio unit 102 sends an attach accept message to V2X-UE 104.1. At 210, V2X-UE 104.1 determines that the V2X application is to send a data packet, which causes V2X-UE 104.1 to send, at 212, a resource block request message to 3GPP radio unit 102 that includes a radio resource request, the data packet (data-pkt) that the V2X-UE 104.1 intends to transmit and for which redundant transmission from the 3GPP radio unit 102 is desired, the Layer 2 destination ID ('Layer-2Dest-Id') for the V2X application, and an indication that the request is associated with a URLLC ultra-reliable type of packet transmission for which the 3GPP radio unit 102 is to duplicate and rebroadcast the data packet. In at least one embodiment, such an indication may be a parameter, such as 'urllc-req', that indicates that replication to provide a redundant transmission of a given data packet is sought by a given V2X-UE (e.g., V2X-UE 104.1) for a replicator (e.g., 3GPP radio unit 102).

At 214, 3GPP radio unit 102 performs validations on the request based on various packet criteria including the maximum packet count and packet size information associated with the V2X application, as may be identified by the Layer 2 destination ID ('Layer-2Dest-Id'). For example, 3GPP radio unit 102 may maintain a packet count for the number of packets for which redundant transmissions have been previously provided for the V2X application and may compare the packet count to the maximum packet count to determine that the maximum packet count has not been reached (e.g., current packet count<maximum packet count). Additionally, 3GPP radio unit 102 may compare the size of the data packet to the maximum packet size allowed for the replication and transmission for the V2X application to determine that the size of the data packet is less than the maximum packet size.

In some embodiments, a radio unit may also validate that URLLC ultra-reliable transmissions are enabled for a given V2X-UE and/or a given V2X application for the V2X-UE. For example, a radio unit may check the 'urllc-enabled' subscription information for the V2X-UE and/or the V2X application to determine whether ultra-reliable transmissions are enabled.

Upon a successful validation, 3GPP radio unit 102 grants the radio resource by sending, at 216 a resource block (RB) grant message to V2X-UE 104.1 that includes the radio channel details for the V2X-UE to transmit the data packet and also includes an indication that 3GPP radio unit 102 will perform the redundant transmission for the data packet. Generally, an RB is the smallest unit of resources that can be allocated to a user/UE. Thus, an RB can be a channel (e.g., an orthogonal frequency-division multiple access (OFDMA) channel composed of orthogonal frequency-division multiplexing (OFDM) subcarriers) for the duration of one time slot in which the RB is 180 kilohertz (kHz) wide in frequency and one slot long in time. In frequency, RBs can be either 12×15 kHz subcarriers or 24×7.5 kHz subcarriers. In at least one embodiment, 3GPP radio unit 102 may include a 'urllc-rsp' parameter in the grant to provide confirmation to V2X-UE 104.1 that 3GPP radio unit 102 can provide the redundant transmission for the data packet. The exchange between V2X-UE 104.1 and 3GPP radio unit 102 at 212 and 216 is also illustrated in FIG. 1.

If the validation at 214 is not successful, the grant is rejected and the V2X-UE 104.1 is not given a radio resource block for transmission. In some embodiments, a given V2X application policy may include one or more URLLC timeout value(s) for one or more period(s) of time, which may be used by a given source V2X-UE to determine a fallback option in case a response ('urllc-rsp') to a URLLC request ('urllc-req') is not received within the period of time and/or if a transmission of a redundant transmission is not confirmed within a period of time (e.g., for Autonomous mode, as discussed below). In at least one embodiment, a V2X application policy may include a fallback option that indicates that a given source V2X-UE (e.g., V2X UE 104.1) is to fallback to Autonomous mode (discussed in further detail below) to facilitate redundant transmissions for a data packet if a request by the V2X-UE for redundant transmission in NA mode is not granted within a given request time period indicated by the V2X application policy. For example, a given source V2X-UE may initialize and start a timer when a request is sent for a given V2X application. If a response to the request is not received within the request time period indicated by the given V2X application policy, one or more fallback options may be triggered for the V2X-UE based on the policy for the given V2X application.

For the present example, it is assumed that the grant is provided by the 3GPP radio unit 102, as shown at 216. By receiving the confirmation from 3GPP radio unit 102, V2X-

UE 104.1 can determine both that the data packet was received by the 3GPP radio unit 102 and that the radio unit can perform redundant transmissions for the V2X application (e.g., is to be the replicator); thereby ensuring that ultra-reliability can be achieved for the data packet transmission. Say, for example, that no resource grant is received from 3GPP radio unit 102. In such an instance, the V2X-UE 104.1 could determine to re-send the data packet to the 3GPP radio unit 102 for ultra-reliable transmission.

Returning to the present example, V2X-UE 104.1 broadcasts the data on the PC5 interface to V2X-UE 104.2 at 218*a* (also shown in FIG. 1) and also broadcasts the data on the PC5 interface to V2X-UE 104.3 at 220*a* (also shown in FIG. 1). For the redundant transmissions, 3GPP radio unit 102 duplicates and broadcasts the data packet using the Layer 2 destination ID (as communicated at 212 from source V2X-UE 104.1 to the 3GPP radio unit 102) via the LTE-Uu interface to each respective V2X-UE 104.2 at 218*b* and V2X-UE 104.3 at 220*b*. V2X-UE 104.2, which is listening on the Layer 2 destination ID, receives the transmission at 218*b* and, at 222, an RHF for V2X-UE 104.2 will handle the duplicate packet to discard the redundant packet. For example, an RHF may hash received packets and, by comparing hashes, may identify duplicate packets for discarding. Similar operations may be performed by V2X-UE 104.3 at 220*b* and 224. In at least one embodiment, the RHF configured for a V2X-UE (e.g., any of V2X-UEs 104.1-104.3) may be configured according to IEEE Frame Replication and Elimination for Reliability (FRER) standards P802.1CB/D2.6. Similar operations may be performed for one or more additional data packets for which V2X-UE 104.1 desires ultra-reliable transmissions for the V2X application.

Accordingly, system 100 provides for the ability to provide ultra-reliability for NA PC5 communications. Advantageously, by including a data packet for which ultra-reliable transmission is sought within a request for resources from a radio unit, techniques provided herein may facilitate minimal delay for duplicate transmissions of the data packet, as compared to other techniques that may involve separate transmissions to a radio unit for duplicate/redundant broadcasts. Thus, techniques provided herein may provide optimized redundant transmissions for meeting URLLC reliability standards.

Figure 3:
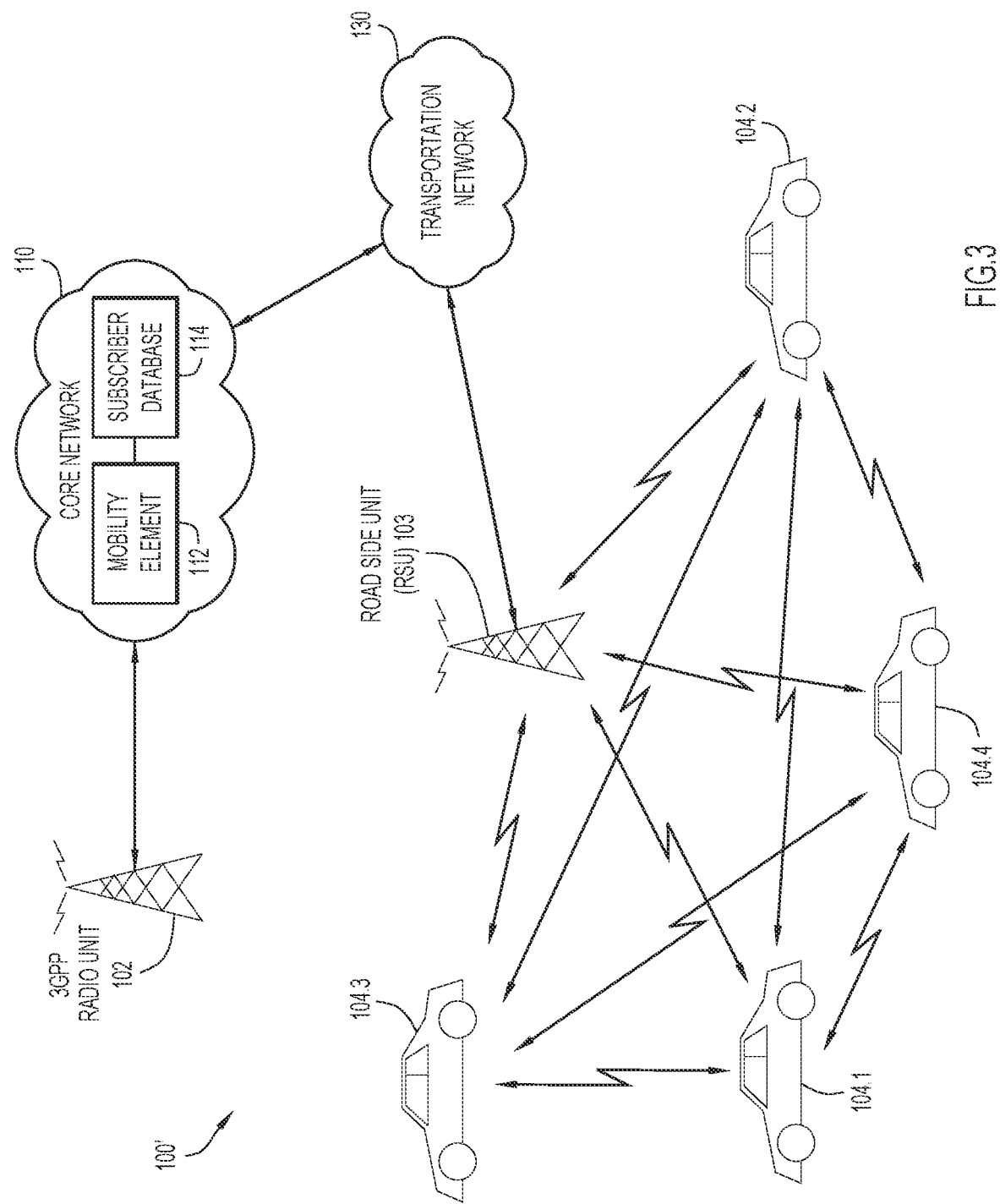
FIG. 3 is a block diagram of another system in which techniques for providing ultra-reliability for C-V2X PC5 communications may be implemented, according to an example embodiment.
Figure 4A:
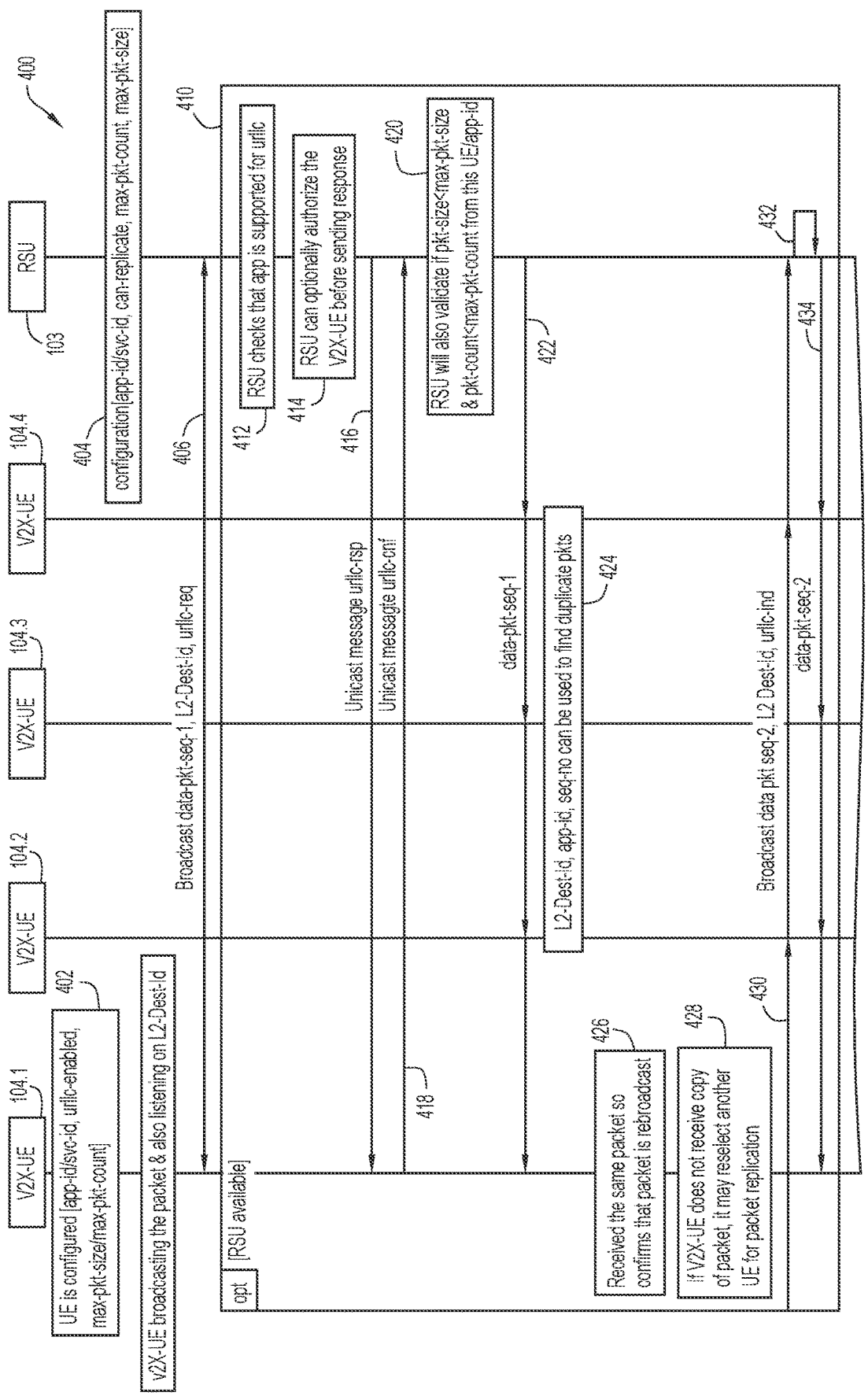
FIGS. 4A and 4B are a message sequence diagram illustrating a call flow for providing ultra-reliability for Autonomous PC5 communications for the system of FIG. 3, according to an example embodiment.
Figure 4B:
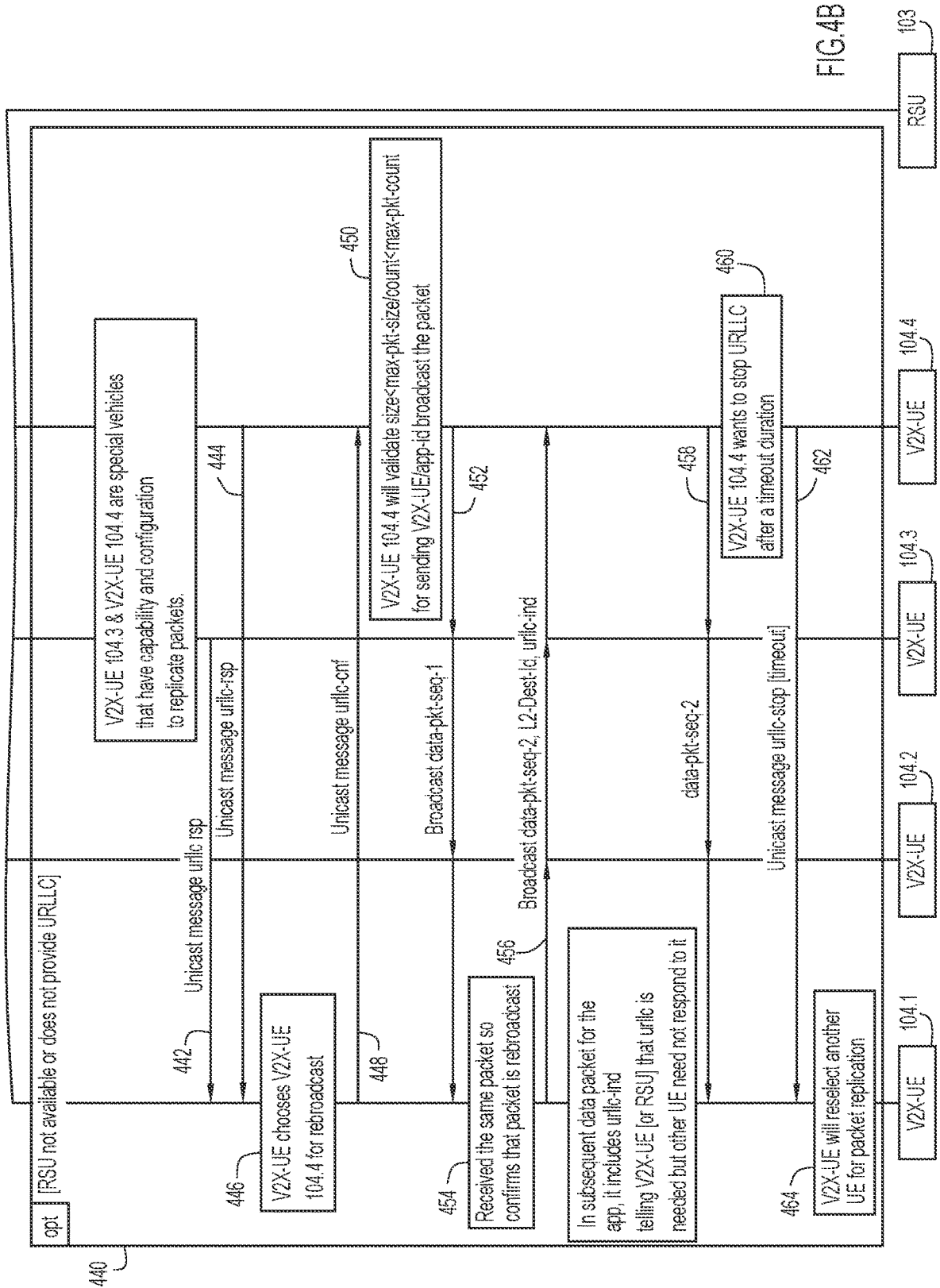

Referring to FIG. 3, FIG. 3 is a block diagram of another system 100' in which techniques for providing ultra-reliability for C-V2X PC5 communications may be implemented, according to an example embodiment. In particular, system 100' may be associated with providing ultra-reliability for Network Assisted (NA) PC5 communications. System 100' may include a Road Side Unit (RSU) 103 and a transportation network 130. Also shown in system 100' are 3GPP radio unit 102 and core network 110 including mobility element 112 and subscriber database 114. Additionally, another V2X-UE 104.3 is also shown in system 100'.

RSU 103 may interface with transportation network 130, which may also interface with core network 110. In general, transportation network 130 may include network elements, etc. that may facilitate communications for one or more V2X applications via RSU 103. RSU 103 may include one or more antenna assemblies as well as transmitter and receiver hardware and/or software to facilitate RF communications. RSU 103 may also include one or more V2X applications to facilitate communications for such V2X applications (e.g., to/from one or more V2X-UEs) and/or any other custom applications.

Given that RSU 103 and each of V2X-UEs 104.1-104.4 is capable of RF communications (transmission and reception), RSU 103 and V2X-UEs 104.1-104.4 may be considered radio units for providing ultra-reliability for Autonomous PC5 communications.

As noted previously, for Autonomous mode PC5 communications when a V2X-UE is not served by an E-UTRA or NR air interface, the V2X-UE can use radio resources configured within the device and/or UICC for communications.

Consider an operational example in which ultra-reliability is provided for Autonomous PC5 communications from V2X-UE 104.1 to each of V2X-UE 104.2, V2X-UE 104.3, and V2X-UE 104.4. The present operational example is discussed with reference to FIGS. 4A and 4B, which are a message sequence diagram illustrating a call flow 400 for providing ultra-reliability for Autonomous PC5 communications within system 100', according to an example embodiment.

For the present example, assume at 402, that V2X-UE 104.1 is configured with at least one V2X application (and policies, privileges, etc. associated therewith) in which the V2X application is associated, at least in part, with a given Layer 2 destination ID ('L2-Dest-Id', as referred to in FIGS. 4A and 4B), an application ID ('app-id') and/or one or more service IDs ('svc-id') associated with the V2X application, an indication that the V2X application is URLLC enabled ('urllc-enabled'), a maximum packet size ('max-pkt-size') for which redundant transmissions may be provided for the V2X application, and a maximum packet count ('max-pkt-count') for which redundant transmissions may be provided for the V2X application. A similar configuration may be provided at 404 for RSU 103. In some embodiments, RSU 103 may receive configurations for one or more V2X applications from subscriber database 114 and/or may be locally configured. For the present example, it is further assumed that V2X-UE 104.1 is capable of broadcasting one or more data packet(s) and also capable of listening on the Layer 2 destination ID for broadcasts from any other radio units (e.g., any of V2X-UEs 104.2-104.4 or RSU 103).

Consider, at 406, that V2X-UE 104.1 performs a broadcast (transmission) that includes a first data packet having a first sequence number ('data-pkt-seq-1'), the Layer 2 destination ID for the V2X application, and indication that the transmission is associated with a URLLC ultra-reliable type of packet transmission for which V2X-UE 104.1 is seeking a radio unit to become a replicator to provide redundant transmissions for the V2X application. In at least one embodiment, such an indication may be the parameter, such as 'urllc-req', that indicates that a given V2X-UE is seeking replication to provide redundant transmissions for a given V2X application.

The identification of a radio unit to become a replicator for data packets for a particular V2X application in order to facilitate ultra-reliable transmissions may vary depending on the environment in which a given V2X-UE is located. For example, in some instances, an RSU may be available to provide ultra-reliable transmissions; however, in other instances, an RSU may not be available or may not support URLLC. Thus, two options for identifying a potential replicator are illustrated for call flow 400. A first option 410 is associated with an RSU (e.g., RSU 103) being available and capable of supporting URLLC for ultra-reliable transmissions and a second option 440 is associated with an RSU not being available or not supporting URLLC.

Recall at 406 that V2X-UE 104.1 broadcast the first data packet ('data-pkt-seq-1') using the Layer 2 destination ID.

Thus, each of V2X-UE 104.2, V2X-UE 104.3, V2X-UE 104.4, and RSU 103, by listening on the Layer 2 destination ID, received the first data packet including the 'urllc-req' indication.

Referring to the first option 410, at 412, upon receiving the broadcast (406) from V2X-UE 104.1, RSU 103 checks (e.g., based on the 'app-id', etc.) to determine that the V2X application is supported for URLLC. In some embodiments, as shown at 414, RSU 103 may optionally authorize that V2X-UE 104.1 is authorized for ultra-reliable transmissions.

Based on positive determinations/validations at 412 and optionally 414, if implemented, RSU 103 sends, at 418, a unicast message to V2X-UE 104.1 that includes an indication that RSU 103 will be the replicator for providing ultra-reliable transmissions for the V2X application. In at least one embodiment, the parameter, such as 'urllc-rsp', may be used to confirm that the radio unit can provide replication for rebroadcasting one or more data packet(s) for a V2X application to facilitate ultra-reliability.

Thus, the communication at 416 provides confirmation to V2X-UE 104.1 that RSU 103 received the first data packet and that RSU 103 is willing to/can be the replicator to provide redundant transmissions for the V2X application. At 418, V2X-UE 104.1 responds with a confirmation confirming RSU 103 as the replicator for the V2X application. In at least one embodiment, a parameter such as 'urllc-cnf' may be used to confirm the replicator for the V2X application.

At 420, RSU 103 validates the first data packet from the V2X-UE 104.1 and/or app-id for the V2X application according to packet criteria including the maximum packet size and maximum packet count for the V2X application (e.g., performing operations as discussed at 214, above). In some embodiments, the validations at 420 may be performed prior to sending the unicast message 416 including the 'urllc-rsp' indication.

Assuming successful validations at 420, RSU 103 transmits, at 422, the first data packet, which is received by each of V2X-UEs 104.1-104.4. At 424, the RHF for each of V2X-UEs 104.2-104.4 may identify the duplicate first data packet based on the Layer 2 destination ID, the app-id, and the sequence number ('seq-1') for the first data packet and may discard the first data packet. At 426, V2X-UE 104.1 confirms, based on receiving and identifying the first data packet, that it was successfully re-broadcast by RSU 103.

In some embodiments, a policy for a given V2X application may indicate one or more one or more fallback options that may be performed if any of the validations at 412, optionally 414, and/or 420 fails and a source V2X-UE for which replication is sought does not receive a response to a request for replication or is unable to confirm that a data packet was successfully re-broadcast. For example, in at least one embodiment a policy for a given V2X application provided for a source V2X-UE for which replication is sought may indicate a fallback option that provides that if any of the validations fails and the V2X-UE does not receive a response within a given request timeout period indicated by the V2X application policy or that the source V2X-UE does not confirm transmission of the redundant packet within a given confirmation timeout period indicated by the V2X application policy, then the source V2X-UE is to attempt to select another replicator to provide replication. Other fallback options, timeout periods, values, etc. can be envisioned.

Consider for the present example, that if V2X-UE 104.1 had not received the first data packet in a subsequent transmission within a given period of time, then V2X-UE 104.1 could perform one or more operations associated with a fallback option for the V2X application that includes reselecting another replicator to provide ultra-reliable transmissions for the V2X application, as shown at 428.

At 430, consider that V2X-UE 104.1 broadcasts for the V2X application a second data packet having a second sequence number ('data-pkt-seq-2') and includes a parameter 'urllc-ind' that indicates that the transmission is associated with a URLLC ultra-reliable type of packet transmission for which the RSU 103 is to duplicate and rebroadcast the data packet. At 432, RSU 103 would validate that the second data packet meets the packet criteria and, upon successful validation, duplicates and re-broadcasts the second data packet at 434, following which operations as discussed above at 424, 426, and 428 may again be performed. Similar operations may be performed for one or more additional data packets for which V2X-UE 104.1 desires ultra-reliable transmissions for the V2X application.

Reference is now made to the second option 440 in which it is assumed that RSU 103 is either not available or does not support URLLC. For the second option 440, it is further assumed that V2X-UE 104.3 and V2X-UE 104.4 are special vehicles that have a capability and configuration to replicate packets to provide ultra-reliability for Autonomous PC5 communications. In at least one embodiment, V2X-UE 104.3 and V2X-UE 104 may request and/or receive subscription information (e.g., app-id, max-pkt-count, max-pkt-size, can-replicate) for V2X-UE 104.1.

Recall at 406 that V2X-UE 104.1 broadcast the first data packet ('data-pkt-seq-1') using the Layer 2 destination ID. Thus, each of V2X-UE 104.2, V2X-UE 104.3, V2X-UE 104.4, and RSU 103, by listening on the Layer 2 destination ID, received the first data packet including the 'urllc-req' indication.

After performing validations (e.g., as discussed above at 412 and optionally 414), V2X-UE 104.3 and V2X-UE 104.4 may each respectively send, at 442 and 444, a unicast message to V2X-UE 104.1 that includes the 'urllc-rsp' indication. Upon receiving the confirmation of willingness to be the replicator from each of V2X-UE 104.3 and V2X-UE 104.4, V2X-UE 104.1 selects, at 446, V2X-UE 104.4 for performing the ultra-reliable transmissions for the V2X application.

It should be understood that the selection discussed in this example is provided for illustrative purposes only and is not meant to limit the broad scope of the present disclosure. In various embodiments, a given V2X-UE may select a replicator from among many potential replicators based on various criteria (e.g., signal strength measurements, velocity information, location information, V2X application policy, security considerations, etc.).

Based on the selection at 446, V2X-UE 104.1 sends, at 448, a unicast message to V2X-UE 104.4 that includes the 'urllc-cnf' indication to confirm V2X-UE 104.4 as the replicator for the V2X application. At 450, V2X-UE 104.4 performs checks on the first data packet according to the packet criteria including the maximum packet size and maximum packet count for the V2X application. In some embodiments, such validations may be performed prior to sending the unicast message at 444. Following successful validations at 450, V2X-UE 104.4 transmits the first data packet ('data-pkt-seq-1') at 452. V2X-UEs 104.2 and 104.3 can discard the duplicate packet. At 454, V2X-UE 104.1 can confirm rebroadcast of the first data packet. At 456, V2X-UE 104.4 can transmit a second data packet having a second sequence number ('data-pkt-seq-2') and can include the 'urllc-ind' indication in the transmission to indicate that V2X-UE 104.4 is to duplicate and rebroadcast the packet but other UEs need not respond to the transmission. At 458, V2X-UE 104.4 transmits (e.g., after performing validations) the second data packet, which V2X-UE 104.1 can confirm.

Consider, after some period of time that V2X-UE 104.4 determines that after some timeout duration that it is not to be the replicator for the V2X application, as shown at 460. Based on such a determination, V2X-UE 104.4 can send a unicast message to V2X-UE 104.1 at 462 that includes an indication that it is to stop providing redundant transmissions for the V2X application and a timeout indication. In at least one embodiment, a parameter, such as 'urllc-stop' can be included in a message to indicate that a given V2X-UE is to stop providing redundant transmissions for a given V2X application after the timeout. At 464, V2X-UE 104.1 determines, based on the message received from V2X-UE 104.4 that it is to reselect another replicator to provide ultra-reliable transmissions for the V2X application. Subsequent operations can then be performed, as discussed above, to identify another replicator to perform redundant transmissions for the V2X application.

Accordingly, system 100' provides for the ability to provide ultra-reliability for Autonomous PC5 communications.

Figure 5:
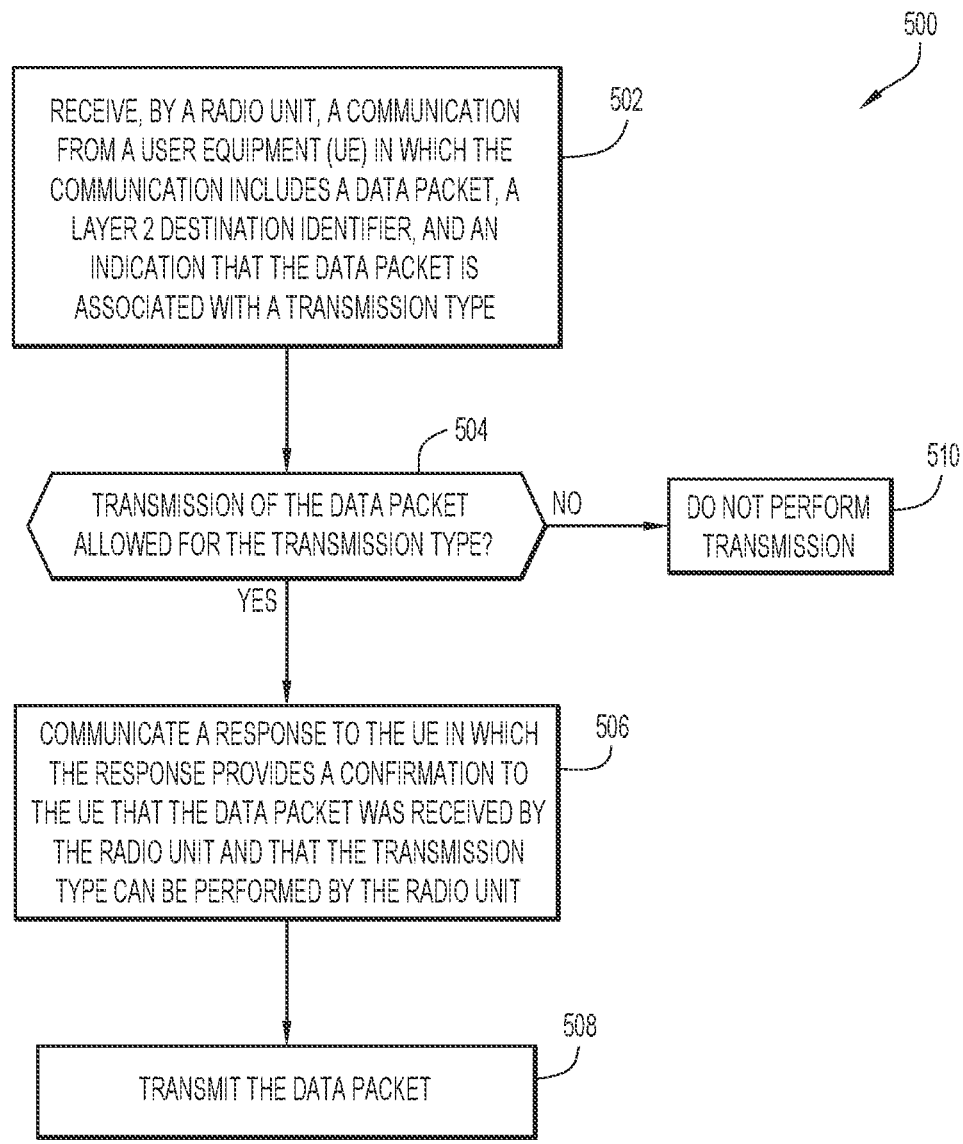
FIG. 5 is a flow chart depicting a method for providing ultra-reliability for C-V2X PC5 communications, according to an example embodiment.

Referring to FIG. 5, FIG. 5 is a simplified flow chart depicting a method 500 for providing ultra-reliability for C-V2X PC5 communications, according to an example embodiment. In various embodiments, method 500 may provide ultra-reliability for C-V2X PC5 communications using NA PC5 communications and/or Autonomous PC5 communications. In at least one embodiment, method 500 may be performed by a radio unit (e.g., any of 3GPP radio unit 102, RSU 103, or V2X-UEs 104.1-104.4).

For method 500, it is assumed that the radio unit has received subscription information (e.g., urllc-enabled, app-id/svc-id, L2-Dest-Id, max-pkt-count, max-pkt-size, can-replicate, etc.) for a UE (e.g., V2X-UE 104.1) for which redundant transmissions can be provided for a V2X application configured for the UE.

At 502, the radio unit receives a communication from the UE in which the communication includes a data packet, a Layer 2 destination identifier, and an indication that the data packet is associated with a transmission type. For example, the indication may indicate that the data packet is associated with a URLLC ultra-reliable type of packet transmission for which replication and rebroadcast of the data packet is sought by the UE for the V2X application configured for the UE.

In at least one embodiment, the communication received from the UE may be a resource block request. In at least one embodiment, the communication received from the UE may be a transmission of the data packet by the UE.

At 504, the radio unit determines whether transmission for the data packet is allowed for the transmission type. In at least one embodiment, the determination at 504 may include determining whether the data packet meets one or more packet criteria for the V2X application (e.g., whether the data packet is less than the maximum packet size allowed for the V2X application and whether a data packet count for the V2X application is less than a maximum packet count allowed for the V2X application).

In some embodiments, prior to determining whether the data packet meets the packet criteria, the radio unit may determine whether the transmission type (e.g., URLLC redundant/replicated transmissions) is allowed for at least one of the UE and the V2X application.

Based on a determination at 504 that transmission for the data packet is allowed for the transmission type, the radio unit communicates, at 506, a response to the UE in which the response provides a confirmation to the UE that the data packet was received by the radio unit and that the transmission type can be performed by the radio unit. At 508, the radio unit transmit the data packet.

Based on a determination at 504 that transmission for the data packet is not allowed for the transmission type, the radio unit may not perform the transmission, as shown at 510. In some embodiments, the operations at 510 may include not providing a grant for radio resources requested by a UE (e.g., for instances in which the radio unit is a 3GPP radio unit for Network Assisted mode). In some embodiments, the operations at 510 may include not providing a URLLC response ('urllc-rsp') and/or not performing replication requested by a UE (e.g., for instances in which the radio unit is a RSU or another V2X-UE for Autonomous mode).

In summary, techniques are provided herein in which a V2X-UE, while sending packet(s) to other radio units such as other V2X-UE on the PC5 (side link), also sends packet(s) to a radio unit of a 3GPP RAN for NA PC5 communications or, for Autonomous PC5 communications, to a RSU (if in proximity and configured to support URLLC communications). For Network Assisted PC5 communications, the radio unit of the 3GPP RAN can be the replicator to provide redundant transmission(s) of the packet. For Autonomous PC5 mode, a radio unit such as the RSU or another V2X-UE can be the replicator to provide redundant transmission of the packet.

Thus, ultra-reliability can be provided to ensure that intended recipients will receive data packet(s) from a source V2X-UE as well as from another radio unit (e.g., a 3GPP RAN node, a RSU, or another V2X-UE). In various embodiments, one or more validations can be performed on a received data packet, the V2X-UE sending the data packet, and/or the V2X application associated with the data packet before a given radio unit determines to be a replicator and/or transmit a redundant packet.

Figure 6:
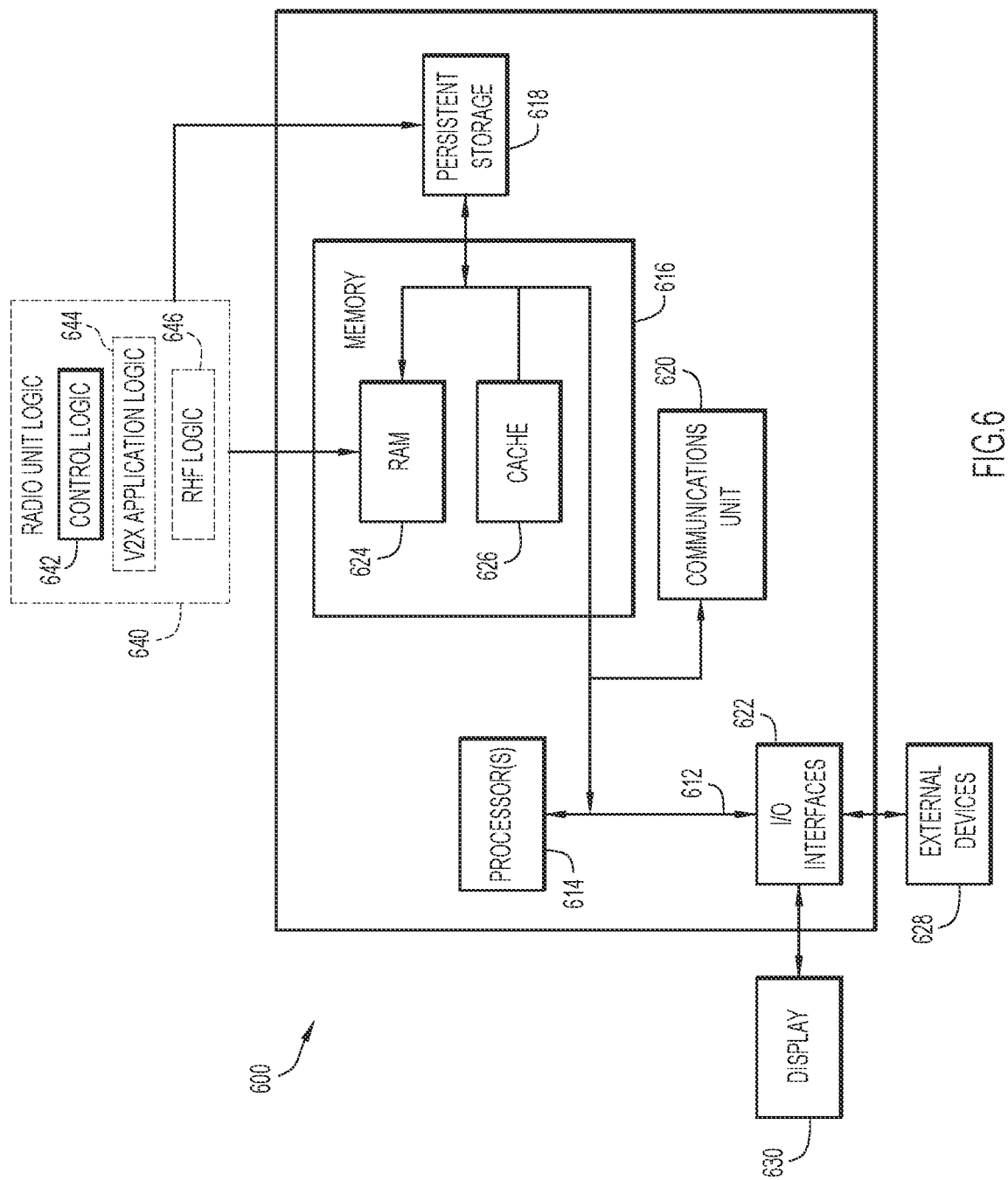
FIG. 6 is a hardware block diagram of a computing device that may perform functions for providing ultra-reliability for C-V2X PC5 communications, in connection with the techniques depicted in FIGS. 1-5.

Referring to FIG. 6, FIG. 6 illustrates a hardware block diagram of a computing device 600 that may perform the functions of a radio unit (e.g., any of 3GPP radio unit 102, RSU 103 or V2X-UEs 104.1-104.4) for providing ultra-reliability for PC5 communications, referred to herein in connection with techniques depicted in FIGS. 1-5. It should be appreciated that FIG. 6 provides only an illustration of one embodiment and does not imply any limitations with regard to the environments in which different embodiments may be implemented. Many modifications to the depicted environment may be made.

As depicted, the computing device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media, which can be inclusive on non-transitory computer readable storage media. In the depicted embodiment, memory 616 includes random access memory (RAM) 624 and cache memory 626. In general, memory 616 can include any suitable volatile or non-volatile computer readable storage media. Instructions for radio unit logic 640 provided for computing device 600 may be stored in memory 616 and/or persistent storage 618 for execution by processor(s) 614. In at least one embodiment, radio unit logic 640 may include control logic 642. In some embodiments, radio unit logic 640 may further include any combination of V2X application logic 644 for one or more V2X applications that may be configured for the computing device 600 and/or RHF logic 646 to handle/discard duplicate packets that may be received by computing device 600. When the processor(s) 614 execute the radio unit logic 640 including any combination of control logic 642, V2X application logic 644, and/or RHF logic 646, the processor(s) 614 are caused to perform the operations described above in connection with FIGS. 1-5.

One or more programs and/or other logic may be stored in persistent storage 618 for execution by one or more of the respective computer processor(s) 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes hardware and/or software for one or more transmitters, receivers, and antennas configured provided for computing device 600. Communications unit 620 may provide communications through the use of either or both physical and wireless communications links.

I/O interface(s) 622 allows for input and output of data with other devices that may be connected to computing device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor, a touch screen, or the like. In some implementations, display 630 may be integrated into computing device 600.

In one form, a computer-implemented method is provided in which the computer-implemented method may include receiving, by a radio unit of a system, a communication from a user equipment (UE), wherein the communication comprises a data packet, a Layer 2 destination identifier, and an indication that the data packet is associated with a transmission type; determining, by the radio unit, whether transmission for the data packet is allowed for the transmission type; based on determining that transmission for the data packet is allowed for the transmission type, communicating a response to the UE, wherein the response provides a confirmation to the UE that the data packet was received by the radio unit and that the transmission type can be performed by the radio unit; and transmitting, by the radio unit, the data packet to one or more other UEs. In one instance, the indication indicates that that data packet is associated with an Ultra-Reliable Low-Latency Communication (URLLC) transmission.

In various instances, the radio unit may be one of: at least one of a Third Generation Partnership Project (3GPP) Fourth Generation (4G) or a Fifth Generation (5G) radio unit; a Road Side Unit (RSU); or a particular UE of the one or more other UEs.

In one instance of the computer-implemented method the data packet is associated with an application of the UE and wherein determining, by the radio unit, whether transmission for the data packet is allowed for the transmission type further includes determining whether the data packet meets one or more packet criteria; and based on determining that the data packet meets the one or more packet criteria, identifying the data packet as allowed for the transmission type. The one or more packet criteria may be included in at least one of subscription information for the UE and policy information associated with the application. The one or more packet criteria may include at least one of: a maximum packet size for the application that is allowed for the transmission type; and a maximum number of packets for the application that are allowed for the transmission type.

In some instances determining, by the radio unit, whether transmission for the data packet is allowed for the transmission type may further include prior to determining whether the data packet meets one or more packet criteria, determining whether the transmission type is allowed for at least one of the UE and the application. In at least one instance, an indication that identifies whether the transmission type is allowed for at least one of the UE and the application is included in at least one of subscription information for the UE and policy information associated with the application.

In some instances, the communication from the UE may a request for radio resources for a Network Assisted PC5 transmission of the data packet by the UE and the response communicated to the UE is a grant for the radio resources. In still some instances, the communication from the UE may be a broadcast from the UE for an Autonomous PC5 transmission of the data packet by the UE.

In some instances, the data packet may be a first data packet and the computer-implemented method may further include receiving, by the radio unit, another communication from the UE comprising a second data packet, the Layer 2 destination identifier and another indication that the second data packet is associated with the transmission type; determining, by the radio unit, whether transmission for the second data packet is allowed for the transmission type; and based on determining that transmission for the second data packet is allowed for the transmission type, transmitting, by the radio unit, the second data packet to one or more other UEs.

The programs/operations described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a radio unit of a system, a communication from a user equipment (UE), wherein the communication comprises a data packet, a Layer 2 destination identifier associated with a vehicle-to-everything (V2X) application of the UE, and an indication that the data packet is associated with a transmission type for an Ultra-Reliable Low-Latency Communication (URLLC) transmission in which the data packet is to be replicated;
determining, by the radio unit based on criteria associated with the V2X application, whether transmission for the data packet is allowed for the transmission type;
based on determining that transmission for the data packet is allowed for the transmission type, communicating a response to the UE, wherein the response provides a confirmation to the UE that the data packet was received by the radio unit and that the transmission type can be performed by the radio unit; and
transmitting, by the radio unit, the data packet to one or more other UEs.

2. The method of claim 1, wherein the radio unit is one of:
at least one of a Third Generation Partnership Project (3GPP) Fourth Generation (4G) or a Fifth Generation (5G) radio unit;
a Road Side Unit (RSU); or
a particular UE of the one or more other UEs.

3. The method of claim 1, wherein the data packet is associated with the V2X application of the UE and wherein determining, by the radio unit, whether transmission for the data packet is allowed for the transmission type further comprises:
  determining whether the data packet meets one or more packet criteria; and
  based on determining that the data packet meets the one or more packet criteria, identifying the data packet as allowed for the transmission type.

4. The method of claim 3, wherein the one or more packet criteria are included in at least one of subscription information for the UE and policy information associated with the V2X application.

5. The method of claim 3, wherein the one or more packet criteria include at least one of:
  a maximum packet size for the V2X application that is allowed for the transmission type; and
  a maximum number of packets for the V2X application that are allowed for the transmission type.

6. The method of claim 3, wherein determining, by the radio unit, whether transmission for the data packet is allowed for the transmission type further comprises:
  prior to determining whether the data packet meets one or more packet criteria,
  determining whether the transmission type is allowed for at least one of the UE and the V2X application.

7. The method of claim 6, wherein an indication that identifies whether the transmission type is allowed for at least one of the UE and the V2X application is included in at least one of subscription information for the UE and policy information associated with the V2X application.

8. The method of claim 1, wherein the communication from the UE is a request for radio resources for a Network Assisted PC5 transmission of the data packet by the UE and the response communicated to the UE is a grant for the radio resources.

9. The method of claim 1, wherein the communication from the UE is a broadcast from the UE for an Autonomous PC5 transmission of the data packet by the UE.

10. The method of claim 1, wherein the data packet is a first data packet, the method further comprising:
  receiving, by the radio unit, another communication from the UE comprising a second data packet, the Layer 2 destination identifier and another indication that the second data packet is associated with the transmission type;
  determining, by the radio unit, whether transmission for the second data packet is allowed for the transmission type; and
  based on determining that transmission for the second data packet is allowed for the transmission type, transmitting, by the radio unit, the second data packet to one or more other UEs.

11. One or more non-transitory computer readable storage media encoded with instructions that, when executed by a processor, cause the processor to perform operations, comprising:
  receiving, by a radio unit of a system, a communication from a user equipment (UE), wherein the communication comprises a data packet, a Layer 2 destination identifier associated with a vehicle-to-everything (V2X) application of the UE, and an indication that the data packet is associated with a transmission type for an Ultra-Reliable Low-Latency Communication (URLLC) transmission in which the data packet is to be replicated;
  determining, by the radio unit based on criteria associated with the V2X application, whether transmission for the data packet is allowed for the transmission type;
  based on determining that transmission for the data packet is allowed for the transmission type, communicating a response to the UE, wherein the response provides a confirmation to the UE that the data packet was received by the radio unit and that the transmission type can be performed by the radio unit; and
  transmitting, by the radio unit, the data packet to one or more other UEs.

12. The media of claim 11, wherein the data packet is associated with the V2X application of the UE and wherein determining, by the radio unit, whether transmission for the data packet is allowed for the transmission type further comprises:
  determining whether the data packet meets one or more packet criteria; and
  based on determining that the data packet meets the one or more packet criteria, identifying the data packet as allowed for the transmission type.

13. The media of claim 12, wherein the one or more packet criteria include at least one of:
  a maximum packet size for the V2X application that is allowed for the transmission type; and
  a maximum number of packets for the V2X application that are allowed for the transmission type.

14. The media of claim 12, wherein determining, by the radio unit, whether transmission for the data packet is allowed for the transmission type further comprises:
  prior to determining whether the data packet meets one or more packet criteria,
  determining whether the transmission type is allowed for at least one of the UE and the V2X application.

15. The media of claim 11, wherein the data packet is a first data packet, the media further comprising instructions that, when executed by a processor, cause the processor to perform further operations, comprising:
  receiving, by the radio unit, another communication from the UE comprising a second data packet, the Layer 2 destination identifier and another indication that the second data packet is associated with the transmission type;
  determining, by the radio unit, whether transmission for the second data packet is allowed for the transmission type; and
  based on determining that transmission for the second data packet is allowed for the transmission type, transmitting, by the radio unit, the second data packet to one or more other UEs.

16. A radio unit comprising:
  at least one memory element for storing data; and
  at least one processor for executing instructions associated with the data, wherein executing the instructions causes the radio unit to perform operations, comprising:
    receiving, by the radio unit, a communication from a user equipment (UE), wherein the communication comprises a data packet, a Layer 2 destination identifier associated with a vehicle-to-everything (V2X) application of the UE, and an indication that the data packet is associated with a transmission type for an Ultra-Reliable Low-Latency Communication (URLLC) transmission in which the data packet is to be replicated;

determining, by the radio unit based on criteria associated with the V2X application, whether transmission for the data packet is allowed for the transmission type;

based on determining that transmission for the data packet is allowed for the transmission type, communicating a response to the UE, wherein the response provides a confirmation to the UE that the data packet was received by the radio unit and that the transmission type can be performed by the radio unit; and transmitting, by the radio unit, the data packet to one or more other UEs.

17. The radio unit of claim 16, wherein the radio unit is one of:
at least one of a Third Generation Partnership Project (3GPP) Fourth Generation (4G) or a Fifth Generation (5G) radio unit;
a Road Side Unit (RSU); or
a particular UE of the one or more other UEs.

18. The radio unit of claim 16, wherein the data packet is associated with the V2X application of the UE and wherein determining, by the radio unit, whether transmission for the data packet is allowed for the transmission type further comprises:
determining whether the data packet meets one or more packet criteria; and
based on determining that the data packet meets the one or more packet criteria, identifying the data packet as allowed for the transmission type.

19. The radio unit of claim 18, wherein the one or more packet criteria include at least one of:
a maximum packet size for the V2X application that is allowed for the transmission type; and
a maximum number of packets for the V2X application that are allowed for the transmission type.

20. The radio unit of claim 18, wherein determining, by the radio unit, whether transmission for the data packet is allowed for the transmission type further comprises:
prior to determining whether the data packet meets one or more packet criteria,
determining whether the transmission type is allowed for at least one of the UE and the V2X application.

* * * * *